United States Patent Office 3,395,199
Patented July 30, 1968

3,395,199
S - (3,4,4 - TRIFLUOROBUTENYL - 3) MONO OR DITHIO PHOSPHATES, PHOSPHONATES OR PHOSPHINATES
Mervin E. Brokke and Thomas E. Elward, Richmond, and Thomas B. Williamson, Santa Clara, Calif., assignors to Stauffer Chemical Company, New York, N.Y., a corporation of Delaware
No Drawing. Filed Sept. 27, 1965, Ser. No. 490,700
6 Claims. (Cl. 260—955)

This invention relates to certain new and novel substituted phosphorus-containing compounds and to the utility of said compounds as parasiticides and may be employed as the toxic constituent in compositions to be used in parasiticidal control. More specifically, this invention relates to compounds of the general formula

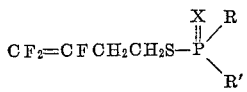

wherein X is oxygen or sulfur and R and R' are alkyl, alkoxy or alkoxyalkoxy radicals containing from 1 to 6 carbon atoms.

The compounds herein contemplated can be prepared by various methods. One such general method applied in preparing the compounds was the condensation between the appropriate substituted thio- or dithio phosphorus-containing salt or acid and 1,1,2-trifluoro-4-bromo-1-butene. The reaction proceeds readily in the liquid phase. The employment of an inert organic solvent is also useful, facilitating processing as well as agitation of the reactants. Temperatures that permit operation in the liquid phase and which are between room temperature and reflux temperature of the solvent, if any is used, are employed. Preferably the reaction mixture is refluxed, usually at an elevated temperature.

It has been found that the compounds of the present invention are particularly effective as parasiticides and are adapted to be employed in compositions for the control of various organisms such as insects, helminth, mites, and the like. The compounds are effective in the control of nematodes when applied to a nematodal habitat. They also can be used for the control of various insect larvae that may be present in soil. The compounds also are particularly effective as systemic parasiticidal agents for animals.

The compounds of the present invention may be prepared in accordance with the following illustrative examples.

Example 1.—Preparation of S-(3,4,4-trifluorobutenyl-3)-O,O-diethyl phosphorodithioate Potassium diethylphosphorodithioate (25 g.) and 18.9 g. of 1,1,2-trifluoro-4-bromo-1-butene were dissolved in 200 ml. of methylethyl ketone. The resulting solution was heated under reflux for two hours. After cooling, the resulting solid was filtered. The filtrate was evaporated under reduced pressure to remove the solvent. The product was then dissolved in benzene, washed with water and dried over anhydrous magnesium sulfate. After removal of the solvent in vacuo, there was obtained 19.9 g. of the title compound, $n_D^{30}$ 1.4730.

*Analysis.*—Calculated: carbon, 32.7; hydrogen, 4.77.
Found: carbon, 32.60; hydrogen, 4.69.

Example 2.—Preparation of S-(3,4,4-trifluorobutenyl-3) bis(O,O-2-methoxyethyl) phosphorodithioate In a similar procedure as Example 1, a mixture of 1,1,2-trifluoro-4-bromo-1-butene (18.9 g.), potassium bis(methoxyethyl) dithiophosphate (30 g.) in benzene (100 ml.) and water (100 ml.) was stirred and heated under reflux for two hours. At the end of this time the benzene layer was separated, washed with water and dried over anhydrous magnesium sulfate. The solvent was then removed in vacuo. There was obtained 16.3 g. of the title compound, $n_D^{30}$ 1.4782.

Example 3.—Preparation of S-(3,4,4-trifluorobutenyl-3)-O-methylethyl phosphonodithioate In a similar manner as Example 1, O-methyl ethyl phosphonodithioic acid (15.6 g.), 1,1,2-trifluoro-4-bromo-1-butene (18.9 g.), potassium carbonate (15.6 g.) and acetone (200 ml.) were mixed together and heated under reflux for two hours. The resulting mixture was cooled and filtered. The solvent was removed under reduced pressure. The crude product was then taken up in benzene, washed with water and dried over anhydrous magnesium sulfate. After removal of the solvent, there was obtained 17.0 g. of the title compound. The infrared analysis supported the proposed structure.

The following is a table of the compounds prepared according to the aforedescribed procedures. Compound numbers have been assigned to each compound and are then used for identification throughout the balance of the application.

TABLE I

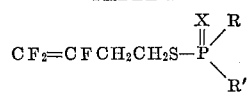

| Compound No: | X | R | R' |
|---|---|---|---|
| 1* | S | OC₂H₅ | OC₂H₅ |
| 2* | S | OCH₂CH₂OCH₃ | OCH₂CH₂OCH₃ |
| 3 | S | O-i-C₃H₇ | O-i-C₃H₇ |
| 4 | S | OCH₃ | OCH₃ |
| 5 | S | O-n-C₃H₇ | O-n-C₃H₇ |
| 6 | O | OC₂H₅ | OC₂H₅ |
| 7* | S | C₂H₅ | OCH₃ |

*No. 1 prepared in Example 1. No. 2 prepared in Example 2. No. 7 prepared in Example 3.

As previously mentioned, the herein described novel compositions produced in the above described manner are biologically active compounds which are useful and valuable in controlling various parasiticidal organisms. The compounds of this invention were tested in the following manner.

Nematocide evaluation test.—This test determines a candidate chemical's action on root-knot nematodes (Meloidogyne, S.P.) in soil. One-pound portions of soil infested with root-knot nematodes were placed in quart jars. The chemical to be tested was pipetted into the nematode infested soil at various dilutions of from 55 to 1 part per million (p.p.m.) or until activity was lost. After mixing the candidate compound into the soil, the soil was sealed for 48 hours. The treated soil was then placed in paper containers and allowed to stand in a greenhouse one week for airing. At the end of this time a tomato plant was transplanted into the soil. The root-knot nematodes attack the tomato plant roots if they survived the chemical treatment, and cause swelling or knots on the roots. Four weeks after treatment the plant was removed from the soil and the roots inspected. The lowest concentration whcih prevented nematode development was recorded. The results are set forth in the table below.

TABLE II.—SOIL NEMATOCIDE TEST

| Compound Number | Concentration (p.p.m.) which allowed no Nematode Development |
| --- | --- |
| 1 | 5 |
| 2 | (25) |
| 3 | 50 |
| 4 | 5 |
| 5 | 50 |
| 6 | 50 |
| 7 | 5 |

( ) = Partial control.

Soil insecticide testing procedure.—The candidate test compound was incorporated into a mixture of sand and vermiculite at a concentration of 5 parts per million (p.p.m.) by weight. The treated mixture was placed in a quart jar. Twenty-five five-day old housefly (*Musca domestica*) larvae were introduced into the treated soil and allowed to remain in the sealed jar for 48 hours.

At the end of this time the larvae were removed and placed on moistened filter paper in a petri dish. The number of mobile larvae and the number of pupae were counted. An immobile larva was considered to be dead. The papae were allowed to remain in the petri dish until the adult flies emerged. Mortality was determined by substracting the number of emerged adult flies from twenty-five, which was the original number of larvate placed in the soil. If ninety or more precent mortality was obtained at the screening concentration, the compound was tested at lower rates until fifty percent mortality was obtained.

When tested in the above-described manner, S-(3,4,4-trifluorobutenyl-3) O,O-diethyl phosphorodithioate and S-(3,4,4-trifluorobutenyl-3) O,O-dimethyl phosphorodithioate were found to produce a fifty percent mortality in controlling fly larvae in soil at 0.1 p.p.m. and 0.5 p.p.m., respectively. Compound number 1 gave 100 percent control at 7.5 p.p.m. for 17 weeks.

Animal systemic evaluation tests. Male Swiss Albino mice fasted 16–20 hours and weighing 18–23 grams were given the candidate compounds orally by stomach tube and subcutaneously by injection in the neck region. Two mice were used per route of administration for each compound tested. Two hours after treatment the mice were killed by cervical dislocation. Both thighs were dissected from each animal without severing internal organs and the tissue was placed in 17 x 55 mm. glass vials, one vial for each test animal. Ten newly hatched black blowfly larvate (*Phormia regina*, Meigen) were placed on the tissue in each vial. The vials were labelled, stoppered with cotton and stored in an incubator at 80° F. and 40–50 percent relative humidity. Compound activity was evaluated on the percentage of larvae mortality after the larvae had fed on the tissue for 48 hours.

The test compounds were formulated at various percentages in solutions with Tween 20® (polyoxyethylene (20) sorbitan monolaurate) and given at an intial dose of 400 mg./kg. of body weight in both test procedures. If the larvae or the mice were killed by the initial dose the test was repeated with successively lower dosages until there was no parasiticidal activity and no lethality to the mice. Table III summarizes the data obtained in the above described tests. The lowest dosage (mg./kg.) displaying no lethality to the mice as well as 80 to 100 percent control of the blowfly larvae is given.

TABLE III.—ANIMAL SYSTEMIC ACTIVITY

| Compound Number | Lowest dosage (mg./kg.) | | | |
| --- | --- | --- | --- | --- |
| | Oral | | Subcutaneous | |
| | Lethal to host | Larvae Control | Lethal to host | Larvae Control |
| 1 | >400 | 50 | >400 | 50 |
| 3 | >400 | 400 | >400 | |
| 4 | >400 | 200 | >400 | 50 |
| 6 | 50 | 50 | 400 | 50 |
| 7 | 400 | 50 | >400 | 25 |

Compounds number 1 and 7 were further tested on guinea pig using both oral and subcutanleous routes of administration. The compounds were formulated as solutions or suspensions in Tween 20®. For each compound one guinea pig was treated orally and one subcutaneously at an initial dose based on information obtained from the above given mouse assay. The guinea pig was wounded on the shoulder and hip and 50 newly hatched blowfly larvae were implanted in each wound site. Wound sites were examined 24 hours after treatment to determine whether the administered compounds killed the implanted larvae. If the larvae were killed, the wounds will be reinfested at 24 hour intervals to determine the durating of residual effects.

On the same treated guinea pigs at 4 and 24 hours after dosing the animals will be restrained and 10 starved stable flies (*Stomoxys calcitrans* (L.)) were allowed to engorge on the guinea pig. All the flies were then removed and held for 24 hours to see if they were killed by the blood they ingest. The following table shows the results of these tests.

TABLE IV.—SYSTEMIC ACTIVITY IN GUINEA PIGS

| Compound Number | Dose, mg./kg. | Route of Admin. | Blowfly larvae mortality | | Stable fly mortality | |
| --- | --- | --- | --- | --- | --- | --- |
| | | | 24 hrs. | 48 hrs. | 4 hrs. | 24 hrs. |
| 1 | 50 | Oral | | | 85 | |
| | 50 | Subcut | | | | 14 |
| | 100 | Oral | 100 | 100 | 100 | 83 |
| | 100 | Subcut | | | 0 | 38 |
| 7 | 50 | Oral | | | 90 | |
| | 50 | Subcut | | | 100 | 100 |
| | 100 | Oral | 100 | 100 | 100 | 100 |
| | 100 | Subcut | 100 | | 100 | 90 |

The compounds of the present invention may be used as effective parasiticides and may be applied in a variety of ways at various concentrations. In practice the compounds are usually formulated with an inert parasiticidal adjuvant, utilizing methods well-known to those skilled in the art, thereby making them suitable for application as dusts, sprays, drenches and the like. The mixtures can be dispersed in water with the aid of a wetting agent or they can be employed in organic liquid compositions, oil-in-water, water-in-oil emulsions, with or without the addition of wetting, dispersing or emulsifying agents. The rate of application will depend upon the nature of the parasite to be controlled and the habitat of said parasite. One particularly advantageous way of applying said parasiticidal compositions comprising the adjuvant and an effective amount of compounds of the present invention to soil is as a spray, drench or dust followed by incorporation. Application of said parasiticidal compositions to animals for systemic control of parasites may be in animal feedstuffs which contain feed components, such as grains, grasses, and the like, and certain beneficial additives such as vitamins, proteins, fats, minerals and carbohydrates. They may be given also in drinking water or skimmed milk, or in the form of tablets or capsules. Further methods of application include sprays, dyes, subcutaneous administration, intramuscular injection, and the like.

Various changes and modifications may be made without departing from the spirit and scope of the invention described herein as will be apparent to those skilled in the art to which it pertains. It is accordingly intended

We claim:
1. Compounds of the formula

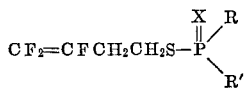

wherein X is selected from the group oxygen and sulfur, and R and R' are selected from the group consisting of alkyl, alkoxy, and alkoxyalkoxy radicals containing from 1 to 6 carbon atoms.

2. The compound, S-(3,4,4-trifluorobutenyl-3)-O,O-diethyl phosphorodithioate.

3. The compound, S-(3,4,4-trifluorobutenyl-3)-bis(O,O-2-methoxyethyl) phosphorodithioate.

4. The compound, S-(3,4,4-trifluorobutenyl-3)-O,O-di-i-propyl phosphorodithioate.

5. The compound, S-(3,4,4-trifluorobutenyl-3)-O,O-diethyl phosphorothioate.

6. The compound, S - (3,4,4-trifluorobutenyl - 3)-O-methylethyl phosphonodithioate.

References Cited
UNITED STATES PATENTS
2,968,591  1/1961  Tracy _____ 260—955 XR CHARLES B. PARKER, *Primary Examiner.*

A. H. SUTTO, *Assistant Examiner.*